US012309860B2

(12) United States Patent
Watanabe (10) Patent No.: US 12,309,860 B2
(45) Date of Patent: May 20, 2025

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Ryo Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 510 days.

(21) Appl. No.: 17/700,138

(22) Filed: Mar. 21, 2022

(65) Prior Publication Data

US 2022/0312523 A1 Sep. 29, 2022

(30) Foreign Application Priority Data

Mar. 26, 2021 (JP) .................. 2021-053213

(51) Int. Cl.
*H04W 76/15* (2018.01)
*H04W 72/00* (2023.01)
(Continued)

(52) U.S. Cl.
CPC ....... *H04W 76/15* (2018.02); *H04W 72/0446* (2013.01); *H04W 72/0453* (2013.01); *H04W 72/30* (2023.01); *H04W 84/12* (2013.01)

(58) Field of Classification Search
CPC ... H04W 28/04; H04W 72/04; H04W 72/042; H04W 88/08; H04W 76/15; H04W 72/30;
(Continued)

(56) References Cited

U.S. PATENT DOCUMENTS 11,665,760 B2 * 5/2023 Ho ................... H04W 84/12
370/329
12,047,873 B2 * 7/2024 Naik ................ H04W 52/0206
(Continued)

FOREIGN PATENT DOCUMENTS

JP 2018050133 A * 3/2018 ........ H04W 74/0816
WO WO 2020/112021 A1 * 6/2020 ............ H04W 72/04

*Primary Examiner* — Gbemileke J Onamuti
*Assistant Examiner* — Sanjay K Dewan
(74) *Attorney, Agent, or Firm* — Canon U.S.A., Inc. IP Division (57) ABSTRACT

A communication apparatus includes an establishment unit configured to establish a first connection between the communication apparatus and a first other communication apparatus via one or more links using one or more first frequency channels, and to establish a second connection between the communication apparatus and a second other communication apparatus via one or more links using one or more first frequency channels, a determination unit configured to determine a frequency channel necessary for arriving a frame transmitted in multicast communication or broadcast communication to the first other communication apparatus and the second other communication apparatus, where the frequency channel is determined from among a plurality of frequency channels used in the links of the first and second connections established by the establishment unit, and a transmission unit configured to transmit the frame on the frequency channel determined by the determination unit.

5 Claims, 7 Drawing Sheets

(51) Int. Cl.
*H04W 72/04* (2023.01)
*H04W 72/0446* (2023.01)
*H04W 72/0453* (2023.01)
*H04W 72/30* (2023.01)
*H04W 84/12* (2009.01)

(58) Field of Classification Search
CPC ......... H04W 72/0446; H04W 72/0453; H04W 84/12; H04W 72/005; H04L 5/007
USPC ......................................................... 370/329
See application file for complete search history.

(56) References Cited

U.S. PATENT DOCUMENTS

| | | | |
|---|---|---|---|
| 2019/0150214 A1* | 5/2019 | Zhou | H04W 76/15 370/329 |
| 2020/0221545 A1* | 7/2020 | Stacey | H04W 84/12 |
| 2020/0396568 A1* | 12/2020 | Huang | H04W 76/40 |
| 2021/0014911 A1* | 1/2021 | Patil | H04W 76/15 |
| 2021/0029588 A1* | 1/2021 | Cariou | H04W 40/244 |
| 2021/0367872 A1* | 11/2021 | Huang | H04L 43/12 |
| 2022/0132423 A1* | 4/2022 | Fang | H04W 76/20 |
| 2022/0140868 A1* | 5/2022 | Yu | H04L 1/0061 370/329 |
| 2022/0140987 A1* | 5/2022 | Park | H04L 27/26 370/329 |
| 2022/0141901 A1* | 5/2022 | Kim | H04W 76/15 370/329 |
| 2022/0159718 A1* | 5/2022 | Fang | H04W 74/0808 |
| 2022/0264429 A1* | 8/2022 | Gan | H04W 28/0221 |
| 2023/0055895 A1* | 2/2023 | Sun | H04W 56/0035 |
| 2023/0083654 A1* | 3/2023 | Jang | H04L 1/18 370/329 |
| 2023/0103807 A1* | 4/2023 | Park | H04W 72/0453 370/329 |
| 2023/0103810 A1* | 4/2023 | Kim | H04W 36/00692 370/329 |
| 2023/0128996 A1* | 4/2023 | Cariou | H04W 12/069 370/329 |
| 2023/0138578 A1* | 5/2023 | Azizi | H04W 52/0261 370/329 |
| 2023/0171691 A1* | 6/2023 | Dong | H04W 52/02 370/311 |
| 2023/0217521 A1* | 7/2023 | Kim | H04W 76/15 370/329 |
| 2023/0254802 A1* | 8/2023 | Kim | H04W 28/02 370/329 |
| 2023/0284290 A1* | 9/2023 | Lanante | H04W 74/085 370/329 |
| 2023/0328774 A1* | 10/2023 | Jang | H04W 76/15 370/329 |
| 2024/0064836 A1* | 2/2024 | Shafin | H04W 76/15 |

* cited by examiner

COMMUNICATION APPARATUS, COMMUNICATION METHOD, AND STORAGE MEDIUM

BACKGROUND

Field of the Disclosure

The present disclosure relates to a communication apparatus that performs wireless communication.

Description of the Related Art

As wireless local area network (WLAN) communication standards devised by the Institute of Electrical and Electronics Engineers (IEEE), the IEEE 802.11 standard series is known. The IEEE 802.11 standard series includes the IEEE 802.11a/b/g/n/ac/ax standards.

The technique discussed in Japanese Patent Application Laid-Open No. 2018-50133 realizes, in addition to a high peak throughput of up to 9.6 gigabits per second (Gbps) that can be realized by using an orthogonal frequency-division multiple access (OFDMA) defined in the IEEE 802.11ax, improvement in a communication speed under a congestion situation.

To further improve throughput, a task group has been launched to devise a standard IEEE 802.11be as a successor standard of the IEEE 802.11ax standard.

In connection with the IEEE 802.11be standard, a communication technology in which one access point (AP) establishes a plurality of links with one station (STA) via a plurality of different frequency channels has been studied.

In the IEEE 802.11be standard, it has been discussed that an AP and a STA establish connection via a plurality of channels and perform multi-link communication therebetween in parallel, using the above described plurality of frequency channels.

When an AP has established connection with a STA via a plurality of frequency channels, in a situation where the AP transmits a frame via multicast communication or broadcast communication, the same frame can be transmitted more than one time to the same STA. Thus, where the AP and the STA are connected via multiple links, the frame can be transmitted redundantly to a frequency channel that does not need to receive the frame (i.e., unnecessary transmission of a frame can be performed by the AP).

SUMMARY

Various embodiments of the present disclosure provide techniques and mechanisms for preventing unnecessary frame transmission to a frequency channel that does not need to receive a frame, when a communication apparatus connects with a plurality of communication apparatuses, and the communication apparatus connects with at least one of the a plurality of communication apparatuses via a plurality of frequency channels.

According to one embodiment, a communication apparatus is provided that includes an establishment unit configured to establish a first connection between the communication apparatus and a first other communication apparatus via one or more links using one or more frequency channels, and to establish a second connection between the communication apparatus and a second other communication apparatus via one or more links using one or more frequency channels. The communication apparatus also includes a determination unit configured to determine a frequency channel necessary for arriving a frame transmitted in multicast communication or broadcast communication to the first other communication apparatus and the second other communication apparatus. The frequency channel is determined from among a plurality of frequency channels used in the links of the first and second connections established by the establishment unit. Further, the communication apparatus includes a transmission unit configured to transmit the frame on the frequency channel determined by the determination unit.

Further features of the present disclosure will become apparent from the following description of example embodiments with reference to the attached drawings.

DESCRIPTION OF THE EMBODIMENTS

Example embodiments of the present disclosure will be described in detail below with reference to the attached drawings. Configurations to be described in the following example embodiments are merely examples, and the present invention is not limited to the illustrated configurations.

Figure 1:
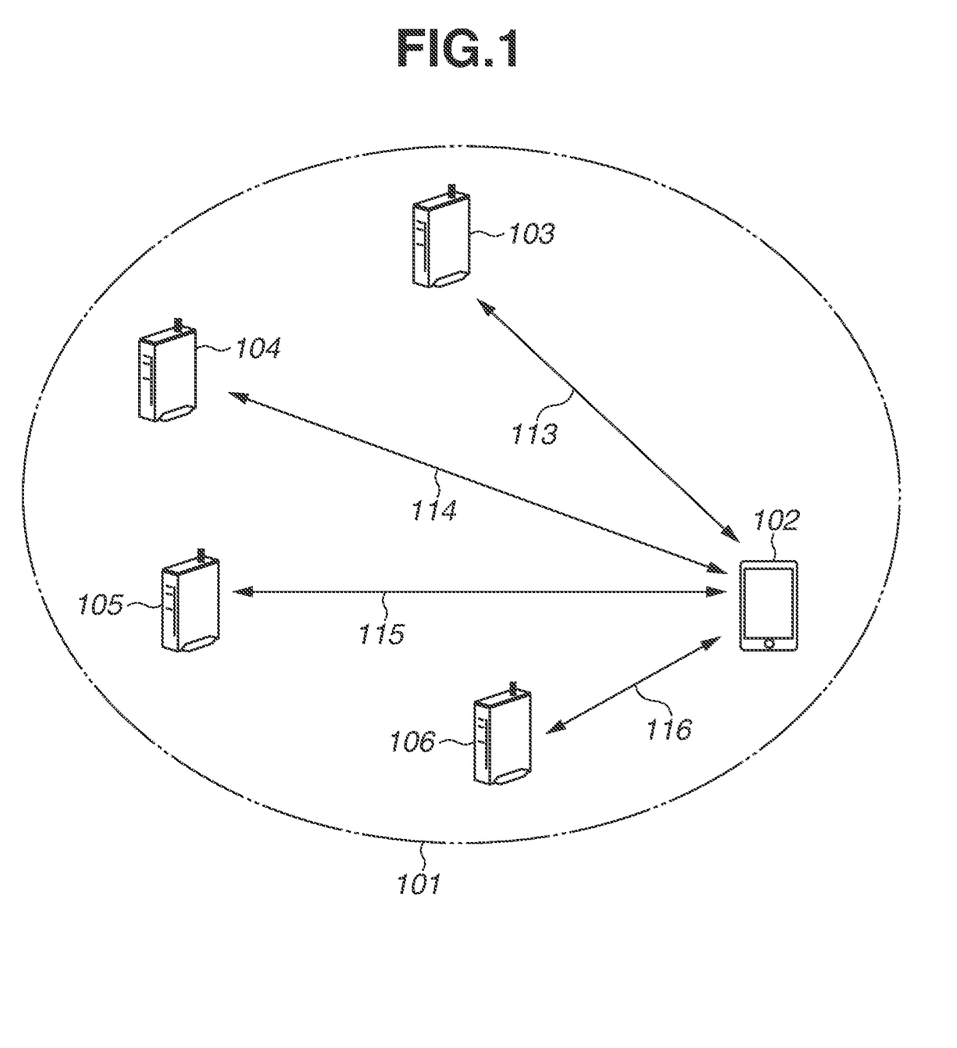
FIG. 1 is a diagram illustrating a configuration of a network established by a communication apparatus according to one embodiment.

A first example embodiment will be described next. FIG. 1 illustrates a configuration of a network established by a communication apparatus 102 according to the present example embodiment. The communication apparatus 102 is an access point (AP) having a role in establishing a network 101. The network 101 is a wireless network.

Each of communication apparatuses 103 to 106 is a station (STA) having a role in participating in the network 101. Each of the communication apparatuses 102 to 106 supports the Institute of Electrical and Electronics Engineers (IEEE) 802.11be (Extremely High Throughput (EHT)) standard, and can execute wireless communication compliant with the IEEE 802.11be standard via the network 101. Each of the communication apparatuses 102 to 106 can perform communication at frequency bands of 2.4 GHz, 5 GHz, and 6 GHz bands. The frequency band to be used by each of the communication apparatuses 102 to 106 is not limited to these bands. For example, a different frequency band such as the 60 GHz band may be used. Each of the communication apparatuses 102 to 106 can perform communication using bandwidths of 20 MHz, 40 MHz, 80 MHz, 160 MHz, and 320 MHz.

The communication apparatuses 102 to 106 can implement multi-user (MU) communication of multiplexing signals of a plurality of users, by executing orthogonal frequency-division multiple access (OFDMA) communication compliant with the IEEE 802.11be standard. In the OFDMA communication, a part (a resource unit (RU)) of the divided frequency band is allocated to each of STAs without overlapping each other, and carrier waves allocated to the respective STAs are orthogonal to each other. Thus, an AP can communicate with a plurality of STAs in parallel. Arrows 113 to 116 indicate that the communication apparatus 102 has one or more wireless connection links to each of the communication apparatuses 103 to 106.

Figure 2:
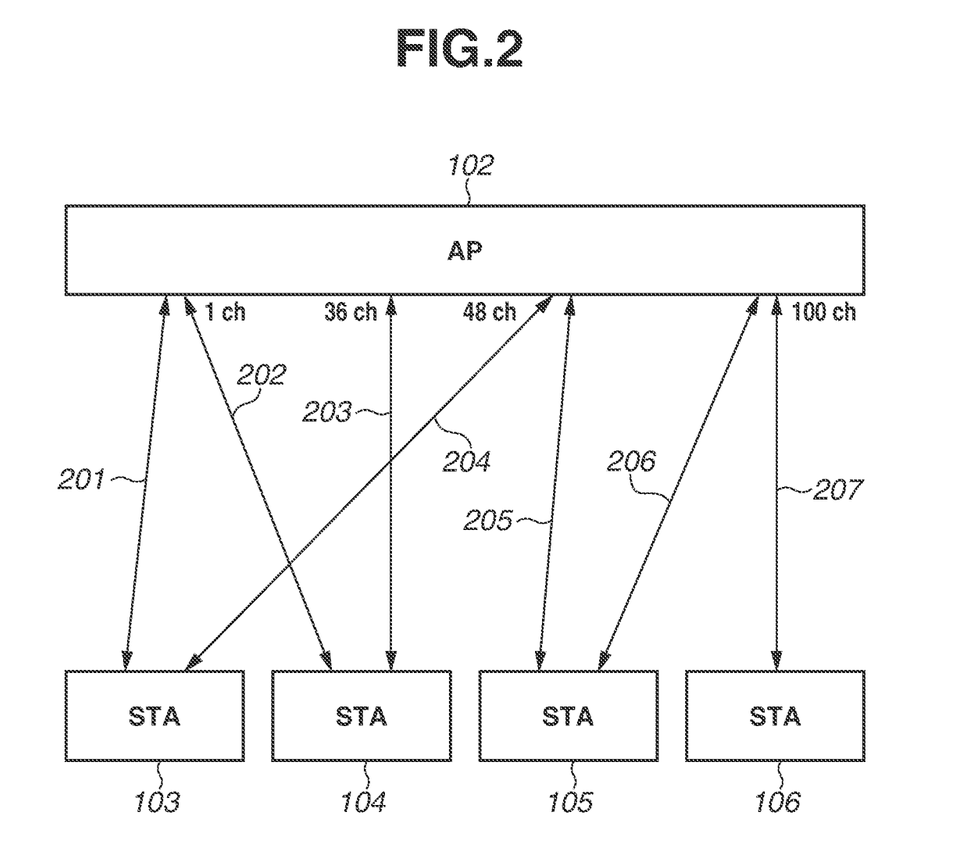
FIG. 2 is a diagram illustrating an example of a frequency channel configuration of the network established by the communication apparatus according to one embodiment.

FIG. 2 illustrates an example of a frequency channel configuration of the network established by the communication apparatus 102. The communication apparatuses 102 to 106 establish links via a plurality of frequency channels, thereby executing multi-link communication. Here, the frequency channels are frequency channels defined in the IEEE 802.11 standard series, and refer to frequency channels at which wireless communication compliant with the IEEE 802.11 standard series is executable. In the IEEE 802.11 standard series, a plurality of frequency channels is defined in each of the frequency bands of 2.4 Hz, 5 GHz, and 6 GHz bands. Further, in the IEEE 802.11 standard series, the bandwidth of each of the frequency channels is defined as 20 MHz. Neighboring channels are bonded together into a bandwidth of 40 MHz or more, and a bandwidth of 40 MHz or more may be used in one frequency channel.

The communication apparatus 102 and the communication apparatus 103 are connected by a frequency channel 1ch indicated by an arrow 201 and a frequency channel 48ch indicated by an arrow 204. The communication apparatus 102 and the communication apparatus 104 are connected by a frequency channel 1ch indicated by an arrow 202 and a frequency channel 36ch indicated by an arrow 203. The communication apparatus 102 and the communication apparatus 105 are connected by a frequency channel 48ch indicated by an arrow 205 and a frequency channel 100ch indicated by an arrow 206. The communication apparatus 102 and the communication apparatus 106 are connected by a frequency channel 100ch indicated by an arrow 207. In this way, the communication apparatus 102 can improve the throughput in the communication with the communication apparatuses 103 to 106 by establishing links with the communication apparatuses 103 to 106 via the plurality of frequency channels. Since the communication apparatus 102 establishes a plurality of connections varying in frequency channel with the communication apparatuses 103 to 106, even in a case where a predetermined frequency band is congested, the communication apparatus 102 can communicate with the communication apparatuses 103 to 106 using the other frequency band. Therefore, a reduction in throughput in the communication with the communication apparatuses 103 to 106 can be prevented.

In the multi-link communication, the plurality of links established between the communication apparatus 102 and each of the communication apparatuses 103 to 106 may at least vary in frequency channel. In the multi-link communication, the channel spacing between the frequency channels of the plurality of links established between the communication apparatus 102 and each of the communication apparatuses 103 to 106 may be at least greater than 20 MHz.

In the case of performing the multi-link communication, the communication apparatus 102 divides one piece of data and transmits the pieces of divided data to a partner apparatus via a plurality of links. Alternatively, the communication apparatus 102 can transmit the same data via the plurality of links established with any of the communication apparatuses 103 to 106 so that the communication performed via one of the links can be used as backup communication for the communication performed via another link.

Specifically, the communication apparatus 102 transmits the same data to the communication apparatus 104 via the first link using the channel 1ch and the second link using the channel 36ch. In this case, even if an error occurs in, for example, the communication via the first link (the channel 1ch), the communication apparatus 104 can receive the data transmitted from the communication apparatus 102 via the second link (the channel 36ch). Alternatively, the communication apparatus 102 may selectively use the links depending on the type of a frame and the type of data to be transmitted. For example, the communication apparatus 102 may transmit a management frame via the first link (the channel 1ch), and may transmit a data frame including data via the second link (the channel 36ch). The management frame refers to, specifically, a beacon frame, a probe request frame/probe response frame, and an association request frame/association response frame. In addition to these frames, a disassociation frame, an authentication frame, a de-authentication frame, and an action frame are each also called a management frame. The beacon frame is a frame that announces network information. The probe request frame is a frame that requests network information, and the probe response frame is a response to the probe request frame and is a frame that provides the network information. The association request frame is a frame that requests a connection, and the association response frame is a response to the association request frame and is a frame indicating whether the connection is permitted or an error in the connection. The disassociation frame is a frame that terminates the connection. The authentication frame is a frame that authenticates a partner apparatus, and the de-authentication frame is a frame that stops the authentication of the partner apparatus and terminates the connection. The action frame is a frame for performing an additional function other than those described above. The communication apparatuses 102 to 106 each transmit and receive the management frame compliant with the IEEE 802.11 standard series. Alternatively, in a case where the communication apparatus 102 transmits data about a captured image, for example, the communication apparatus 102 may transmit meta information such as a date, parameters (an aperture value and a shutter speed) when images are captured, and position information via the first link, and may transmit pixel information via the second link.

The communication apparatuses 102 to 106 can execute multiple-input and multiple-output (MIMO) communication. In this case, the communication apparatuses 102 to 106 each have a plurality of antennas, and either of the communication apparatus 102 or any of the communication apparatuses 102 to 106 transmits different signals through the respective antennas using the same frequency channel. The receiver simultaneously receives all signals arriving from a plurality of streams using the plurality of antennas, separates the signals of the respective streams, and decodes the separated signals. By thus executing the MIMO communication, the communication apparatuses 102 to 106 can communicate more data for the same period of time than in a case where the MIMO communication is not executed. In addition, in the case of performing the multi-link communication, the communication apparatuses 102 to 106 may execute the MIMO communication in part of the links.

The communication apparatuses 102 to 106 support the IEEE 802.11be standard in the present example embodiment, but may support at least one of legacy standards that are standards before the IEEE 802.11be standard in addition to or in place of the IEEE 802.11be standard. The legacy standards are the IEEE 802.11a/b/g/n/ac/ax standards. In the present example embodiment, at least one of the IEEE 802.11a/b/g/n/ac/ax/be standards and successor standards thereof will be referred to as the IEEE 802.11 standard series. The communication apparatuses 102 to 106 can support, in addition to the IEEE 802.11 standard series, other communication standards such as Bluetooth®, near field communication (NFC), ultra-wideband (UWB), Zigbee®, and Multiband Orthogonal frequency-division multiplexing Alliance (MBOA). The UWB includes wireless Universal Serial Bus (USB), wireless 1394, and Winet, for example. Further, the communication apparatuses 102 to 106 can support a communication standard for wired communication such as a wired local area network (LAN).

Specific examples of the communication apparatus 102 include a wireless LAN router and a personal computer (PC), but the communication apparatus 102 is not limited to these examples. The communication apparatus 102 may be any type of communication apparatus if this apparatus can execute multi-link communication with other communication apparatuses. Specific examples of the communication apparatuses 103 to 106 include a camera, a tablet, a smartphone, a PC, a mobile phone, and a video camera, but the communication apparatuses 103 to 106 are not limited to these examples. The communication apparatuses 103 to 106 may each be any type of communication apparatus if this apparatus can execute wireless link communication with another communication apparatus. The network 101 illustrated in FIG. 1 and FIG. 2 includes one AP and four STAs, but the number of APs and the number of STAs are not limited thereto.

Figure 3:
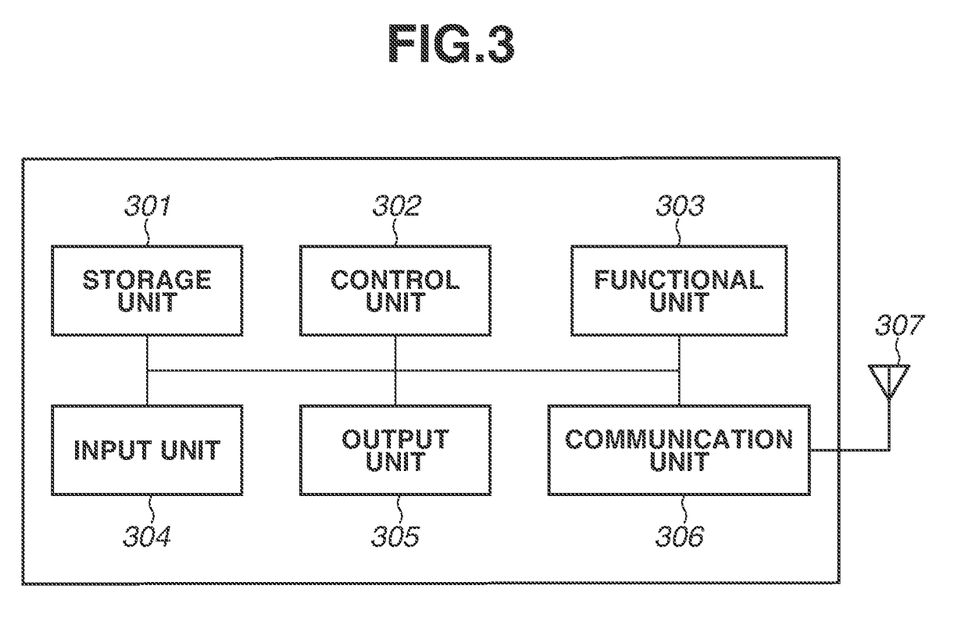
FIG. 3 is a diagram illustrating a hardware configuration of the communication apparatus according to one embodiment.

FIG. 3 illustrates a hardware configuration of the communication apparatus 102 in the present example embodiment. The communication apparatus 102 has a storage unit 301, a control unit 302, a functional unit 303, an input unit 304, an output unit 305, a communication unit 306, and an antenna 307.

The storage unit 301 includes at least one memory such as a read only memory (ROM) or a random access memory (RAM), and stores a computer program for performing various operations to be described below, and various kinds of information such as a communication parameter for wireless communication. Besides the memory such as the ROM or the RAM, a storage medium such as a flexible disk, a hard disk, an optical disk, a magneto-optical disk, a compact disc ROM (CD-ROM), a CD recordable (CD-R), a magnetic tape, a nonvolatile memory card, or a digital versatile disk (DVD) may be used as the storage unit 301. The storage unit 301 may include a plurality of memories.

The control unit 302 includes at least one processor such as a central processing unit (CPU) or a micro processing unit (MPU), and controls the entire communication apparatus 102 by executing the computer program stored in the storage unit 301. The control unit 302 may control the entire communication apparatus 102 based on the collaboration of the computer program stored in the storage unit 301 and an operating system (OS). In addition, the control unit 302 generates data and a signal (a wireless frame) to be transmitted in communication with other communication apparatuses. The control unit 302 may include a plurality of processors such as a multi-core processor, and may control the entire communication apparatus 102 by using the plurality of processors.

Further, the control unit 302 executes predetermined processing such as wireless communication, image capturing, printing, and projection, by controlling the functional unit 303. The functional unit 303 is hardware for the communication apparatus 102 to execute the predetermined processing.

The input unit 304 receives various operations from a user. The output unit 305 provides various outputs to a user via a monitor screen and a speaker. Here, the output from the output unit 305 may be display on the monitor screen, sound output from the speaker, and vibration output. The input unit 304 and the output unit 305 may be implemented into one module such as a touch panel. The input unit 304 and the output unit 305 may be integrated with or independent of the communication apparatus 102.

The communication unit 306 controls the wireless communication compliant with the IEEE 802.11be standard. The communication unit 306 may control wireless communication compliant with other standards of the IEEE 802.11 standard series in addition to IEEE 802.11be standard, and may control wired communication using a wired LAN or the like. The communication unit 306 controls the antenna 307 to transmit and receive signals for wireless communication generated by the control unit 302. In a case where the communication apparatus 102 supports other standards such as an NFC standard and a Bluetooth® standard in addition to the IEEE 802.11be standard, the communication apparatus 102 may control wireless communication compliant with these communication standards. In a case where the communication apparatus 102 can execute wireless communication compliant with a plurality of communication standards, the communication apparatus 102 may be configured to include a communication unit and an antenna for each of the communication standards. The communication apparatus 102 communicates data, such as image data, document data, and video data, with the communication apparatus 103 via the communication unit 306. The antenna 307 may be configured independently of the communication unit 306, or may be configured integrally with the communication unit 306 to form one module.

The antenna 307 can perform communication in the 2.4 GHz, 5 GHz, and 6 GHz bands. In the present example embodiment, the communication apparatus 102 includes one antenna, but may have different antennas for the respective frequency bands. In a case where the communication apparatus 102 includes a plurality of antennas, the communication apparatus 102 may have the communication unit 306 for each of the antennas.

The communication apparatuses 103 to 106 each have a hardware configuration similar to that of the communication apparatus 102.

Figure 4:
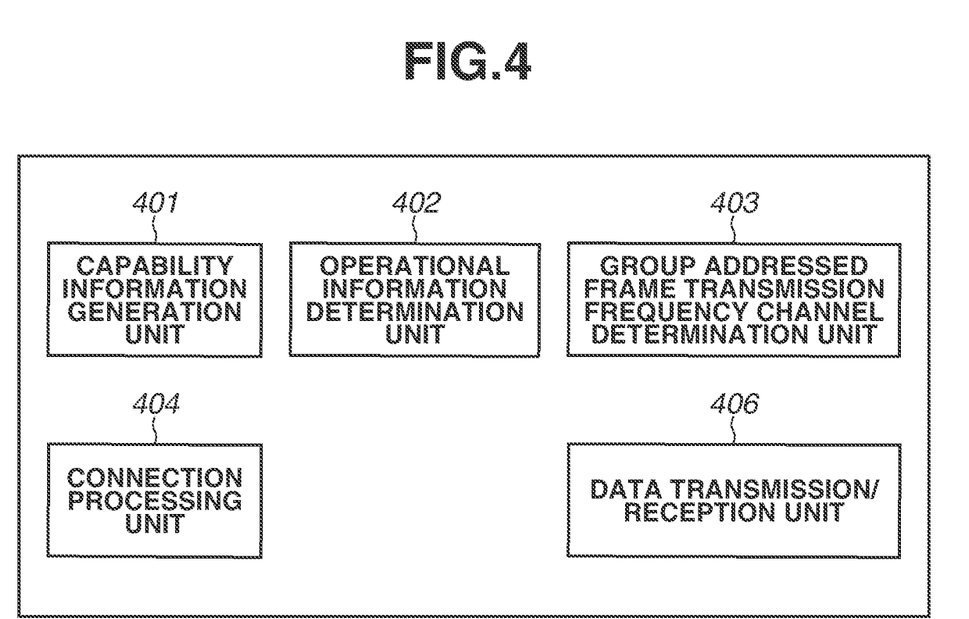
FIG. 4 is a diagram illustrating a functional configuration of the communication apparatus according to one embodiment.

FIG. 4 illustrates a functional configuration of the communication apparatus 102 according to the present example embodiment. The communication apparatus 102 includes a capability information generation unit 401 for multi-link communication, an operational information determination unit 402 for multi-link communication, a group addressed frame transmission frequency channel determination unit 403, a connection processing unit 404, and a data transmission/reception unit 406.

The capability information generation unit 401 is a block that generates capability information about the multi-link communication performed by the communication apparatus 102. The communication apparatus 102 generates capability information to notify another communication apparatus of its own capability about the multi-link communication. Here, the capability information refers to a frequency band, a frequency channel, and a bandwidth that can be used by the communication apparatus 102. The communication apparatus 102 may notify another communication apparatus of its own capability information, or may only receive from another communication apparatus capability information about the partner apparatus.

The operational information determination unit 402 is a block that determines operational information about the multi-link communication with the partner apparatus based on the capability information about its own apparatus and the partner apparatus related to the multi-link communication. The operational information related to the multi-link communication refers to a frequency channel, a bandwidth, and the like to be used in the multi-link communication between the communication apparatus 102 and each of the communication apparatuses 103 to 106. The determined operational information may be or may not be notified the partner apparatus.

The group addressed frame transmission frequency channel determination unit 403 is a block that determines a target frequency channel group to be used for transmission of a group addressed frame. The frequency channels of the target frequency channel group to be used for transmission of the group addressed frame are determined based on information about connection of a frequency channel acquired from the capability information generation unit 401 or the connection processing unit 404. Here, the group addressed frame refers to a frame including an address having a group bit set to 1, in a media access control (MAC) address to be included in a destination address (DA) of a MAC frame. For example, a frame transmitted in broadcast communication such as a beacon frame is one type of group addressed frame since the group bit is set to 1. Similarly, a multicast frame is also a group addressed frame since the group bit is set to 1. The group addressed frame is transmitted in multicast communication or broadcast communication.

The connection processing unit 404 is a block that performs processing for enabling the communication apparatuses 103 to 106 serving as the STAs to join in the network established by the communication apparatus 102. Specifically, for example, the connection processing unit 404 causes the communication apparatus 102 to transmit an association response frame as a response to an association request that is a connection request received from the communication apparatus 103. The communication apparatus 102 may have the connection processing unit 404 for each of the plurality of links which the communication apparatus 102 establishes, or may use one connection processing unit 404 in a time sharing manner.

The data transmission/reception unit 406 is a block that transmits and receives data frames in the multi-link communication based on the operational information related to the multi-link communication determined by the operational information determination unit 402.

The communication apparatuses 103 to 106 each have a functional configuration similar to that of the communication apparatus 102, but are different in the following point.

The communication apparatuses 103 to 106 each include a request information determination unit (not illustrated) in replace of the operational information determination unit 402. The request information determination unit is a block that determines request information related to the multi-link communication established with a partner apparatus based on the capability information about its own apparatus and the partner apparatus related to the multi-link communication. The request information related to the multi-link communication refers to a frequency channel, a bandwidth, and the like that are requested for use in the multi-link communication between the communication apparatus 102 and each of the communication apparatuses 103 to 106. The determined request information may be notified or may not be notified the partner apparatus.

Figure 5:
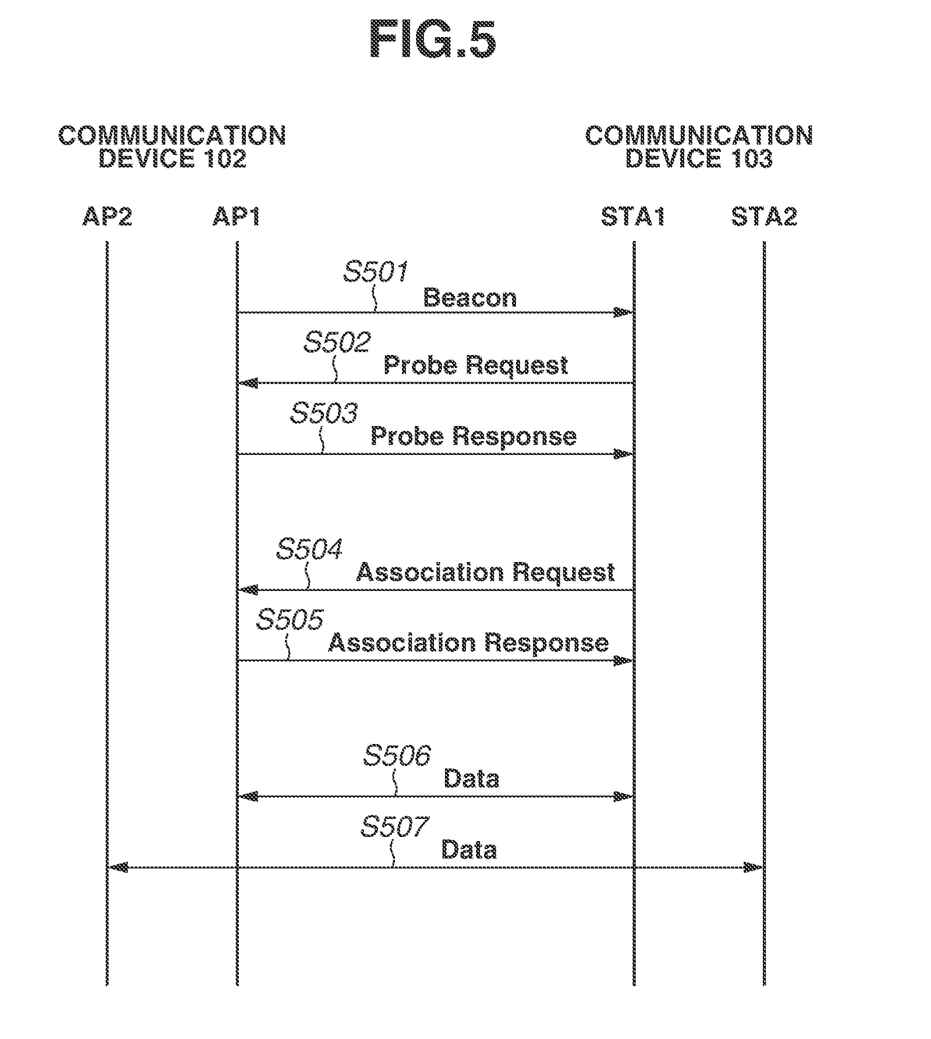
FIG. 5 is a sequence diagram illustrating an example of processing to be executed in a case where the communication apparatus and another communication apparatus perform multi-link communication according to one embodiment.

FIG. 5 is a sequence diagram illustrating an example of processing to be executed in a case where the communication apparatus 102 and the communication apparatus 103 perform the multi-link communication.

A description will be given of an example in which the communication apparatus 102 and the communication apparatus 103 perform communication via the first link using the channel 1ch in the 2.4 GHz band, and perform processing for communication via the second link using the channel 36ch in the 5 GHz band.

The processing in the sequence illustrated in FIG. 5 starts when both of the communication apparatuses 102 and 103 are powered on. Alternatively, at least one of the communication apparatuses 102 and 103 may start the processing in response to an instruction to start the multi-link communication from a user or an application. Yet alternatively, at least one of the communication apparatuses 102 and 103 may start the processing when the amount of data to be communicated with the partner apparatus reaches a predetermined threshold or more.

First, in step S501, the communication apparatus 102 transmits a beacon including network information about the communication apparatus 102 using the channel 1ch, thereby notifying nearby STAs of the network information. The network information is, specifically, a transmission interval for the transmission of the beacon by the communication apparatus 102, and a service set identifier (SSID) of the communication apparatus 102. In addition, the communication apparatus 102 may include the network information in the beacon, thereby announcing the capability information about the communication apparatus 102 related to the multi-link communication.

In step S502, upon receiving the beacon transmitted from the communication apparatus 102 via the channel 1ch, the communication apparatus 103 transmits a probe request via the channel 1ch. The probe request includes the SSID of the communication apparatus 103. In addition, the communication apparatus 103 announces the capability information about the communication apparatus 103 related to the multi-link communication.

In step S503, upon receiving the probe request, the communication apparatus 102 transmits a probe response to the communication apparatus 103 via the channel 1ch. In a case where the capability information related to the multi-link communication is not included in the beacon, the communication apparatus 102 transmits the probe response including the capability information. Alternatively, the communication apparatus 102 may include only a part of the capability information related to the multi-link communication in the beacon, and include the remaining information or all the information in the probe response.

The communication apparatuses 102 and 103 can exchange the capability information related to the multi-link communication with each other by performing the processing in step S501 to step S503.

Next, in step S504, the communication apparatus 103 transmits an association request that is a connection request to the communication apparatus 102 via the channel 1ch. In this case, the communication apparatus 103 may announce the capability information about the communication apparatus 103 related to the multi-link communication by including the capability information about the communication apparatus 103 related to the multi-link communication in the association request.

The communication apparatus 103 may determine the capability information to be transmitted in step S504, based on the capability information about the communication apparatus 102 related to the multi-link communication acquired in at least one of step S501 and step S503. For example, suppose that whereas the communication apparatus 103 can combine links in the 2.4 GHz band and links in the 5 GHz band in the multi-link communication, the communication apparatus 102 supports only a plurality of links within the 2.4 GHz band. In this case, the communication apparatus 103 may transmit only capability information about the communication apparatus 103 for establishment of the plurality of links in the 2.4 GHz band, as the capability information transmitted in this step. In the present example embodiment, the description has been given of the case in which the communication apparatus 103 transmits the capability information about the communication apparatus 103 related to the multi-link communication in step S502. The configuration, however, is not limited thereto, and the communication apparatus 103 may transmit the capability information only in this step, without transmitting the capability information in step S502. Alternatively, the communication apparatus 103 may transmit the request information requested for performing the multi-link communication, instead of the capability information, by including the capability information related to the multi-link communication in the association request. The request information requested by the communication apparatus 103 may be indicated by the capability information related to the multi-link communication, or may be indicated by another element.

In step S505, upon receiving the association request, the communication apparatus 102 transmits an association response to the communication apparatus 103 via the channel 1ch. The association response transmitted in this step includes the operational information for performing the multi-link communication with the communication apparatus 103 determined by the communication apparatus 102. Further, in a case where the association request including the requested operational information is transmitted by the communication apparatus 103 serving as the STA in step S504, the communication apparatus 102 may transmit the association response including only approval or denial of the request.

In a case where the communication apparatus 103 can execute the multi-link communication based on the operational information included in the association response, in step S506, the communication apparatuses 102 and 103 establish a link via the channel 1ch, and start data communication. Further, in a case where operational information about a link via the channel 36ch is included in the operational information transmitted by the communication apparatus 102, in step S507, the communication apparatuses 102 and 103 also establish the link via the channel 36ch, and start data communication.

The processing in step S506 is similarly performed in a case where the communication apparatus 102 transmits a response indicating approval in step S505, with respect to the request information requested by the communication apparatus 103 in step S504. In a case where request information about the link via the channel 36ch is also included in the request information transmitted by the communication apparatus 103 in step S504, the processing in step S507 is performed.

In the present example embodiment, two links are established by transmission and reception of frames using one frequency channel. However, the number of links to be established is not limited thereto, and three or more links may be established.

In the present example embodiment, the case where the multi-link communication starts in a state where no link has yet been established between the communication apparatuses 102 and 103 is described, but the configuration is not limited thereto.

The communication apparatuses 102 and 103 may start the multi-link communication by establishing a new link in addition to a link that has been already established. In this case, if the capability information about the communication apparatus 102 serving as the AP related to the multi-link communication is already acquired, the communication apparatus 103 serving as the STA may start from step S504. Alternatively, in a case where the capability information about the communication apparatus 103 related to the multi-link communication is already acquired, the communication apparatus 102 may transmit a signal for causing the communication apparatus 103 to transmit the association request, and thus the processing may be started from step S504. Alternatively, the communication apparatuses 102 and 103 may establish a new link in addition to a plurality of links which have been already established. In these cases, the processing in the sequence in FIG. 5 may be started from step S504.

In the present example embodiment, the description has been given of the case where links are established via a plurality of frequency channels by transmission and reception of frames via one frequency channel, but the configuration is not limited thereto. In a case where the multi-link communication is executed, the communication apparatuses 102 and 103 may disconnect links already established there between via a plurality of frequency channels by transmission and reception of frames via one frequency channel.

As illustrated in FIG. 5, by transmitting and receiving frames via a certain frequency channel (or link), the communication apparatuses 102 and 103 can control establishment and disconnection of a link via another frequency channel. In addition, by transmitting and receiving frames via a certain frequency channel (or link), the communication apparatuses 102 and 103 can control establishment and disconnection of links via a plurality of frequency channels.

Similarly, by transmitting and receiving frames via a certain frequency channel (or link), the communication apparatus 102 and each of the communication apparatuses 104 to 106 can also control establishment and disconnection of a link in another frequency channel.

Further, in the sequence in FIG. 5, the sender may include an own multi-link device (MLD) MAC address thereof in at least one of the management frames transmitted in step S501 to step S505 described above. The MLD MAC address is identification information on a communication apparatus that can perform multi-link communication.

Furthermore, the sender may include the own MLD MAC address thereof in at least one of frames other than the management frames transmitted in step S501 to step S505.

Figure 6:
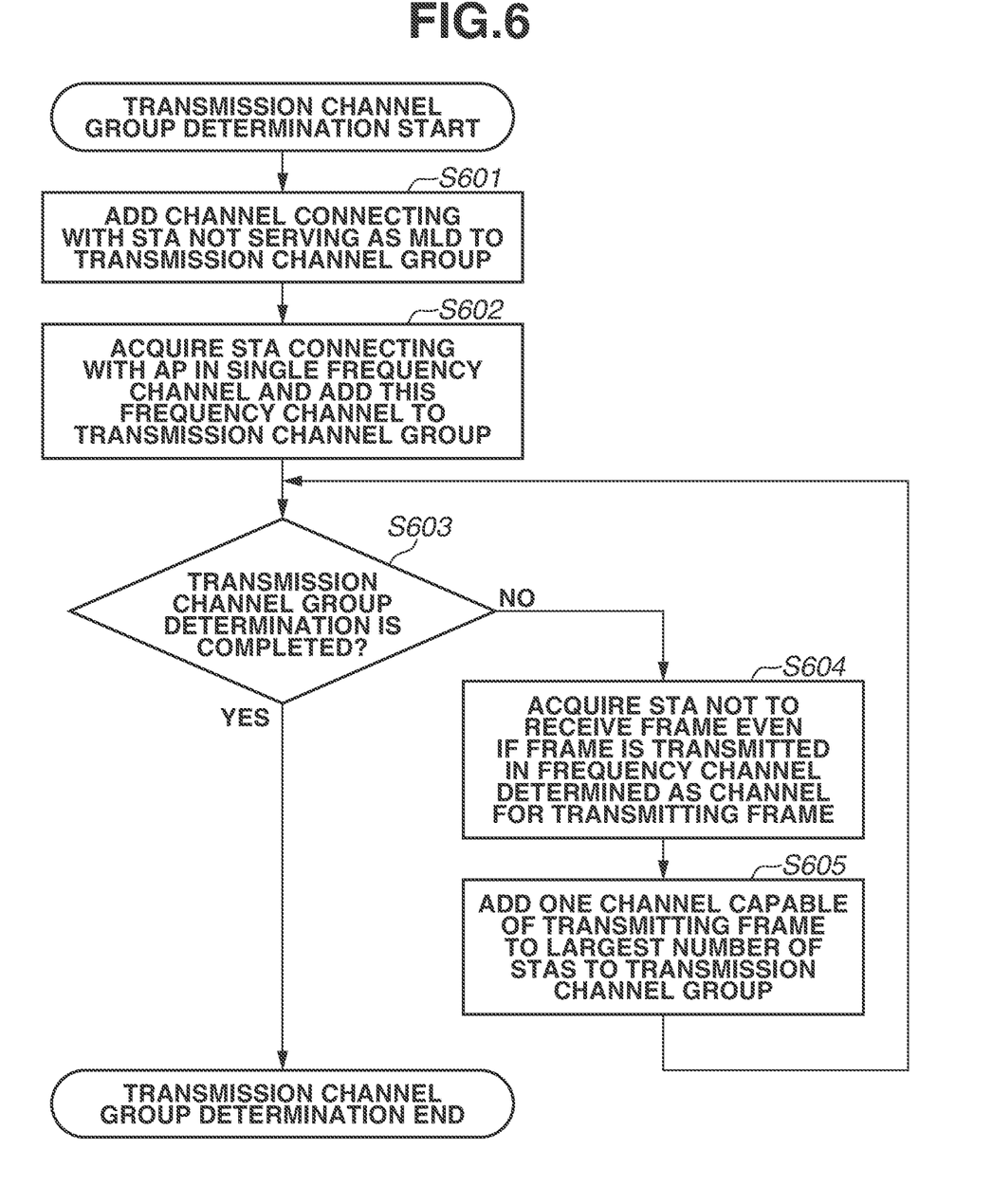
FIG. 6 is a flowchart of determining a transmission frequency channel group for transmitting a frame according to one embodiment.

FIG. 6 is a flowchart illustrating a flow of processing performed when the control unit 302 executes a program stored in the storage unit 301 of the communication apparatus 102. In the present example embodiment, a description will be given of an example in which a frequency channel via which frames are transmitted is determined when the determination of the frequency channel is not completed yet.

The processing in this flowchart is started when the communication apparatus 102 transmits a group addressed frame. Alternatively, the communication apparatus 102 may start the processing in this flowchart when a change occurs in a connection configuration in which the communication apparatus 102 is connected to another communication apparatus. The case where a change occurs in the connection configuration refers to, for example, a case where the communication apparatus 102 starts a connection with another communication apparatus using a new link, or a case where a connection with another communication apparatus is terminated.

First, in step S601, the communication apparatus 102 determines a frequency channel having established a connection with a STA not serving as a MLD, as a frequency channel via which frames are transmitted, among frequency channels connecting with STAs. In other words, the communication apparatus 102 adds the frequency channel to a transmission frequency channel group. Here, the MLD is a communication apparatus that can execute communication with a partner apparatus via a plurality of frequency channels in parallel. In the present example embodiment, because the communication apparatuses 103 to 106 are all MLDs, no frequency channel is added to the transmission frequency channel group here.

In step S602, the communication apparatus 102 identify a STA connecting with the communication apparatus 102 using a single frequency channel, and determines the frequency channel as a frequency channel via which frames are transmitted. In other words, the communication apparatus 102 adds the frequency channel to the transmission frequency channel group. A method of identifying an STA having established connection with the communication apparatus 102 using a single frequency channel will be described below. The communication apparatus 102 has acquired respective MLD MAC addresses of the communication apparatuses 103 to 106 at the time of connection establishment in each of frequency channels via which the communication apparatus 102 has established connections with the communication apparatuses 103 to 106.

Referring to the configuration example illustrated in FIG. 2, for example, the communication apparatus 103 has established the connection with the communication apparatus 102 via the channels 1ch and 48ch, and thus the communication apparatus 102 has acquired two MLD MAC addresses from the communication apparatus 103. The communication apparatus 103 is thus not an STA having established connection with the communication apparatus 102 via a single frequency channel Meanwhile, for example, the communication apparatus 106 has established connection with the communication apparatus 102 only via the channel 100ch, and thus the communication apparatus 102 has acquired one MLD MAC address of the communication apparatus 106.

In the present example embodiment, the MLD MAC address or MLD MAC addresses acquired at the time of connection establishment is or are used as described above, but the configuration is not limited thereto. A MLD MAC address acquired at a different timing may be used to search for a corresponding MLD. For example, in step S602, the communication apparatus 102 may make an inquiry to a communication apparatus to be connected via each of frequency channels, about an MLD MAC address of the communication apparatus to be connected.

In the configuration example illustrated in FIG. 2, the communication apparatus 102 and the communication apparatus 105 have established the connection via the channels 48ch and 100ch, and the communication apparatus 102 and the communication apparatus 106 have established the connection via the channel 100ch. In FIG. 2, because the connection between the communication apparatus 102 and the communication apparatus 105 and the connection between the communication apparatus 102 and the communication apparatus 106 have been established via the channel 100ch that is common to both of them, frames are transmitted via the channel 100ch.

A description will be given of a case where the communication apparatus 102 and the communication apparatus 105 establish a connection via a single frequency channel, the communication apparatus 102 and the communication apparatus 106 establish a connection via two different frequency channels, and the three frequency channels are different frequency channels from one another. In the foregoing case where three frequency channels are different frequency channels from one another, frames are transmitted to the single frequency channel. In such a manner, the number of frequency channels for transmitting frames can be limited by determining a frequency channel for transmitting frames, and frames can also be reliably transmitted to an STA having established a connection via a single frequency channel.

In step S603, the communication apparatus 102 determines whether determination of a transmission frequency channel group is completed. This determination method will be described below with reference to FIG. 7, and thus the description thereof will be omitted here. If the determination is completed (YES in step S603), the flow of the transmission frequency channel group determination ends.

If the determination of a transmission frequency channel group is not completed (NO in step S603), the processing proceeds to step S604. In step S604, the communication apparatus 102 acquires a STA not to receive frames even if the frames are transmitted in the frequency channels determined in step S601 or step S602. Referring to the configuration example illustrated in FIG. 2, because it is determined that the frames are transmitted via the channel 100ch in step S602, the frames are transmitted to each of the communication apparatuses 105 and 106. However, the frames are not transmitted to either of the communication apparatuses 103 and 104, so that STAs acquired in step S604 are the communication apparatuses 103 and 104.

In step S605, the communication apparatus 102 adds a frequency channel that can transmit frames to the largest number of STAs among the STAs acquired in step S604, to the transmission frequency channel group. In other words, in a case where there is an identical frequency channel among the frequency channels by which the communication apparatus 102 is connected to the STAs acquired in step S604, the frames are transmitted via the frequency channel Referring to the configuration example illustrated in FIG. 2, each of the communication apparatus 103 and the communication apparatus 104 has established the connection with the communication apparatus 102 via the channel 1ch, so that frames can be transmitted to the largest number of communication apparatuses (STAs) via the channel 1ch. Therefore, the channel 1ch is added to the transmission frequency channel group. In other words, because the connection between the communication apparatus 102 and the communication apparatus 104 and the connection between the communication apparatus 102 and the communication apparatus 103 are both established via the channel 1ch that is the identical frequency channel, the frames are transmitted via the channel 1ch.

In step S605, the frequency channel via which the frames are transmitted is determined. In other words, the frequency channel via which the frames are transmitted is added to the transmission frequency channel group in step S605. After the frequency channel is added to the transmission frequency channel group, the processing returns to step S603 and the communication apparatus 102 determines whether the determination of a frequency channel for transmitting frames is completed. In the present example embodiment, referring to the configuration example illustrated in FIG. 2, frames can be transmitted to the communication apparatuses 103 to 106 if the frames are transmitted using the transmission frequency channel group of the channels 1ch and 100ch, and therefore, the flow of the transmission frequency channel group determination ends.

In a case where there are two or more frequency channels that can transmit frames to the largest number of STAs, one may be selected therefrom at random, may be selected based on the order of the channel numbers of the frequency channels, or may be selected by a different determination method. As the different determination method, there is a method of determining a frequency channel while avoiding a frequency channel used by an STA operating in a power-saving state, a heavily congested frequency channel, and a frequency channel operating in a non-simultaneous transmit receive (non-STR).

Figure 7:
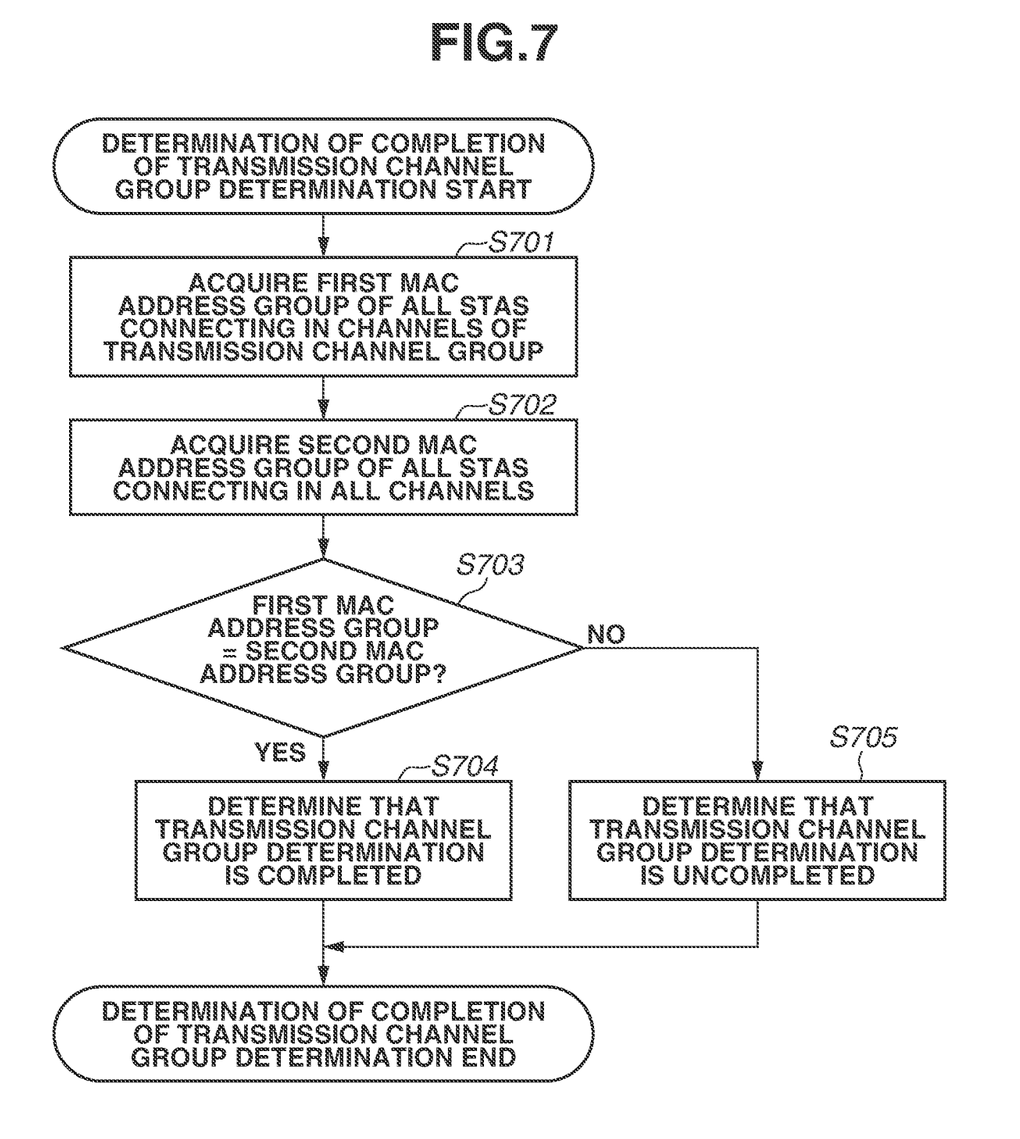
FIG. 7 is a flowchart of determining completion of the determination of the transmission frequency channel group for transmitting the frame according to one embodiment.

FIG. 7 is a flowchart illustrating a flow of processing performed when a program stored in the storage unit 301 of the communication apparatus 102 is executed by the control unit 302. In this flowchart, the communication apparatus 102 determines whether determination of a frequency channel group for transmitting a group addressed frame is completed, when transmitting the group addressed frame to the communication apparatuses 103 to 106.

In step S701, the communication apparatus 102 acquires a first MAC address group that is a group of MAC addresses of STAs each having established a connection via the frequency channel determined as a frequency channel for transmitting a frame. In the present example embodiment, a MLD MAC address is used as a MAC address of an STA.

In step S702, the communication apparatus 102 acquires a second MAC address group that is a group of MAC addresses of all STAs having established connections via all frequency channels. As for the first MAC address group and the second MAC address group, the first MAC address group may be acquired beforehand, instead of being acquired at the timing when the completion of the determination of the frequency channel group for transmitting frames is determined. For example, the first MAC address group may be acquired when a connection with an STA is established or terminated.

In step S703, the communication apparatus 102 determines whether the first MAC address group and the second MAC address group coincide with each other. If the communication apparatus 102 determines that the first MAC address group and the second MAC address group coincide with each other (YES in step S703), the processing proceeds to step S704. In step S704, the communication apparatus 102 determines that the determination of the transmission frequency channel group is completed. When the completion of the determination of the frequency channel for transmitting a frame is determined in step S704, the flow of determining the completion of the determination of the transmission frequency channel group ends, without transmitting frames via a frequency channel other than the determined transmission frequency channel group.

If the communication apparatus 102 determines that the first MAC address group and the second MAC address group do not coincide with each other (NO in step S703), the processing proceeds to step S705. In step S705, the communication apparatus 102 determines that the determination of the transmission frequency channel group is not completed, and the flow of processing in this flowchart ends.

According to the present example embodiment, the communication apparatus 102 can determine a frequency channel for transmitting frames, based on a STA that has not established a connection using a frequency channel determined as a channel for transmitting a frame, and the number of frequency channels that have established connections with the STA. Further, the number of frequency channels for transmitting frames can be limited by determining the frequency channel for transmitting a frame in the manner described above.

The example in which the completion is determined using a MAC address is illustrated in FIG. 7, but the present example embodiment is not limited thereto, and multi-link information to be shared when an AP and a STA establish a connection may be used. Further, the completion of the determination of a frequency channel for transmitting frames may be determined using a MAC address of a STA.

In the above-described example embodiment, FIG. 3 illustrates the example in which a communication apparatus having the hardware configuration illustrated in FIG. 3 executes the flowchart in each of FIGS. 6 and 7. However, a wireless chip including the storage unit 301, the control unit 302, and the communication unit 306 illustrated in FIG. 3 may execute the flowchart in each of FIGS. 6 and 7. In other words, a communication apparatus according to the present example embodiment may be a wireless chip having the storage unit 301, the control unit 302, and the communication unit 306 illustrated in FIG. 3.

A storage medium storing a program code of software for implementing the above-described function may be supplied to a system or apparatus, and a computer (CPU or MPU) of the system or apparatus may read out and execute the program code stored in the storage medium. In this case, the program code itself read out from the storage medium implements the function of the above-described example embodiment, and the storage medium storing the program code is included in the above-described device.

Usable examples of the storage medium for supplying the program code include a flexible disk, a hard disk, an optical disk, a magneto-optical disk, a CD-ROM, a CD-R, a magnetic tape, a nonvolatile memory card, a ROM, and a DVD.

Further, the above-described function may be implemented not only by executing the program code read out by the computer, but also by execution of a part or all of actual processing by an OS operating on the computer, based on an instruction of the program code.

Furthermore, the program code read out from the storage medium may be written in a memory included in a function expansion board inserted into the computer or a function expansion unit connected to the computer.

A CPU included in the function expansion board or the function expansion unit may perform a part or all of actual processing, based on the instruction of the program code to implement the above-described function.

Various embodiments according to the present disclosure can also be implemented by processing for supplying a program for implementing one or more functions of the above-described example embodiment to a system or apparatus via a network or storage medium, and causing one or more processors in a computer of the system or apparatus to read and execute the program. Various embodiments according to the present disclosure can also be implemented by a circuit (e.g., application specific integrated circuit (ASIC)) that implements the one or more functions.

According to various embodiments of the present disclosure, it is possible to inhibit unnecessary frame transmission to a frequency channel that does not need to receive a frame, when a communication apparatus is connected to a plurality of communication apparatuses, and the communication apparatus is connected to at least one of the communication apparatuses via a plurality of frequency channels.

Other Embodiments

Various embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-053213, filed Mar. 26, 2021, which is hereby incorporated by reference herein in its entirety.

What is claimed is:

1. A communication apparatus comprising:
    an establishment unit configured to establish a connection between the communication apparatus and a first other communication apparatus via one or more links, and to establish a connection between the communication apparatus and a second other communication apparatus via one or more links;
    a determination unit configured to determine a frequency channel necessary for arrival of a frame transmitted in broadcast communication to the first other communication apparatus and the second other communication apparatus, wherein the frequency channel is determined from among a plurality of frequency channels used in the links of the first and second connections established by the establishment unit; and
    a transmission unit configured to transmit the frame on a frequency channel determined by the determination unit,
    wherein, upon a condition that two links are established between the communication apparatus and the first other communication apparatus by the establishment unit via a first frequency channel and a second frequency channel, and two links are established between the communication apparatus and the second other communication apparatus by the establishment unit via the second frequency channel and a third frequency channel and that there does not exist other communication apparatus with which a link with the communication apparatus is established, the determination unit determines each of the first frequency channel and the second frequency channel as the frequency channel for transmitting the frame,
    wherein, upon the condition being met, the transmission unit performs transmission control of transmitting the frame on the first frequency channel and the second frequency channel determined by the determination unit, and
    wherein, upon the condition being met, in the transmission control performed by the transmission unit, the frame is not transmitted on the third frequency channel in a situation where a link is established between the second other communication apparatus and the communication apparatus.

2. The communication apparatus according to claim 1, wherein the frame is a group addressed frame.

3. The communication apparatus according to claim 1, wherein the communication apparatus performs communication compliant with the Institute of Electrical and Electronics Engineers (IEEE) 802.11 standard series.

4. A method for a communication apparatus, the method comprising:
    establishing a connection between the communication apparatus and a first other communication apparatus via one or more links, and establishing a connection between the communication apparatus and a second other communication apparatus via one or more links;
    determining a frequency channel necessary for arrival of a frame transmitted in broadcast communication to the first other communication apparatus and the second other communication apparatus, wherein the frequency channel is determined from among a plurality of frequency channels used in the links of the established first and second connections; and
    transmitting the frame on the determined frequency channel,
    wherein, upon a condition that two links are established between the communication apparatus and the first other communication apparatus via a first frequency channel and a second frequency channel, and two links are established between the communication apparatus and the second other communication apparatus via the second frequency channel and a third frequency channel and that there does not exist other communication apparatus with which a link with the communication apparatus is established, determines each of the first frequency channel and the second frequency channel as the frequency channel for transmitting the frame,
    wherein, upon the condition being met, performs transmission control of transmitting the frame on the first frequency channel and the second frequency channel, and wherein, upon the condition being met, in the transmission control, the frame is not transmitted on the third frequency channel in a situation where a link is established between the second other communication apparatus and the communication apparatus.

5. A non-transitory computer-readable storage medium storing a program to cause a computer to perform a method for a communication apparatus, the method comprising:

establishing a connection between the communication apparatus and a first other communication apparatus via one or more links, and establishing a connection between the communication apparatus and a second other communication apparatus via one or more links;

determining a frequency channel necessary for arrival of a frame transmitted in broadcast communication to the first other communication apparatus and the second other communication apparatus, wherein the frequency channel is determined from among a plurality of frequency channels used in the links of the established first and second connections; and transmitting the frame on the determined frequency channel, wherein, upon a condition that two links are established between the communication apparatus and the first other communication apparatus via a first frequency channel and a second frequency channel, and two links are established between the communication apparatus and the second other communication apparatus via the second frequency channel and a third frequency channel and that there does not exist other communication apparatus with which a link with the communication apparatus is established, determines each of the first frequency channel and the second frequency channel as the frequency channel for transmitting the frame, wherein, upon the condition being met, performs transmission control of transmitting the frame on the first frequency channel and the second frequency channel, and wherein, upon the condition being met, in the transmission control, the frame is not transmitted on the third frequency channel in a situation where a link is established between the second other communication apparatus and the communication apparatus.

* * * * *